(12) United States Patent
Lin

(10) Patent No.: US 9,557,784 B1
(45) Date of Patent: Jan. 31, 2017

(54) ELECTRONIC DEVICE WITH CARRIER FOR STORAGE DEVICE

(71) Applicants: NANNING FUGUI PRECISION INDUSTRIAL CO., LTD., Nanning (CN); HON HAI PRECISION INDUSTRY CO., LTD., New Taipei (TW)

(72) Inventor: Chih-Kai Lin, New Taipei (TW)

(73) Assignees: NANNING FUGUI PRECISION INDUSTRIAL CO., LTD., Nanning (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/974,229

(22) Filed: Dec. 18, 2015

(30) Foreign Application Priority Data

Nov. 27, 2015 (TW) .............................. 104139654 A

(51) Int. Cl.
*G06F 1/16* (2006.01)
*G06F 1/18* (2006.01)
*G11B 33/02* (2006.01)

(52) U.S. Cl.
CPC ............... *G06F 1/187* (2013.01); *G06F 1/181* (2013.01); *G11B 33/025* (2013.01)

(58) Field of Classification Search
CPC ................................ G06F 1/187; G06F 1/181
USPC .......................... 361/679.33, 679.37, 679.39
See application file for complete search history.

(56) References Cited

U.S. PATENT DOCUMENTS

| | | | | |
|---|---|---|---|---|
| 6,798,651 B2 * | 9/2004 | Syring | ................. | G11B 33/124 248/623 |
| 7,345,869 B2 * | 3/2008 | Hsiao | ...................... | G06F 1/184 312/223.2 |
| 7,391,608 B2 * | 6/2008 | Tsai | ......................... | G06F 1/184 345/163 |
| 7,643,280 B2 * | 1/2010 | Chen | .................... | G11B 33/123 361/679.33 |
| 8,730,685 B2 * | 5/2014 | Chen | ...................... | G06F 1/187 361/679.33 |
| 2004/0264117 A1 * | 12/2004 | Yang | ..................... | G06F 1/1658 361/679.33 |
| 2006/0061956 A1 * | 3/2006 | Chen | .................... | G11B 33/124 361/679.4 |
| 2006/0279925 A1 * | 12/2006 | Shi | ......................... | G06F 1/183 361/679.32 |
| 2007/0058333 A1 * | 3/2007 | Kim | ........................ | G06F 1/187 361/679.59 |

(Continued)

*Primary Examiner* — Nidhi Thaker
(74) *Attorney, Agent, or Firm* — Zhigang Ma

(57) ABSTRACT

An electronic device includes a chassis, a carrier for a storage device, and a cover. The chassis includes a panel defining an opening. A supporting frame is received in the chassis and forms two resilient hooks. The carrier is received in the supporting frame and defines two hooking slots engaging with the resilient hooks. The cover is detachably mounted on the panel and includes a covering plate covering the opening. A pulling mechanism extends down from a middle of a bottom of the covering plate and includes two protrusions. When the cover is detached from the panel and rotated to allow the pulling mechanism to extend through the opening, the protrusions engage in the hooking slots and disengage the resilient hooks from the hooking slots. When the cover is pulled outward, the carrier is pulled out of the opening by the protrusions.

11 Claims, 8 Drawing Sheets

(56) References Cited

U.S. PATENT DOCUMENTS

| | | | |
|---|---|---|---|
| 2010/0254080 A1* | 10/2010 | Tamaki | G11B 33/123 361/679.33 |
| 2011/0222235 A1* | 9/2011 | Easton | G06F 1/187 361/679.33 |
| 2012/0218704 A1* | 8/2012 | Chen | G06F 1/187 361/679.33 |
| 2015/0043150 A1* | 2/2015 | Liu | G06F 1/185 361/679.33 |

* cited by examiner

ELECTRONIC DEVICE WITH CARRIER FOR STORAGE DEVICE

FIELD

The subject matter herein generally relates to an electronic device with a carrier for a storage device.

BACKGROUND

A storage device, such as a hard disk drive, is generally mounted in a chassis of an electronic device. To detach the storage device, the chassis of the electronic device needs to be opened firstly, then the storage device may be detached manually, which is troublesome, and is apt to damage components in the electronic device.

BRIEF DESCRIPTION OF THE DRAWINGS

Implementations of the present technology will now be described, by way of example only, with reference to the figures.

DETAILED DESCRIPTION

Figure 1:
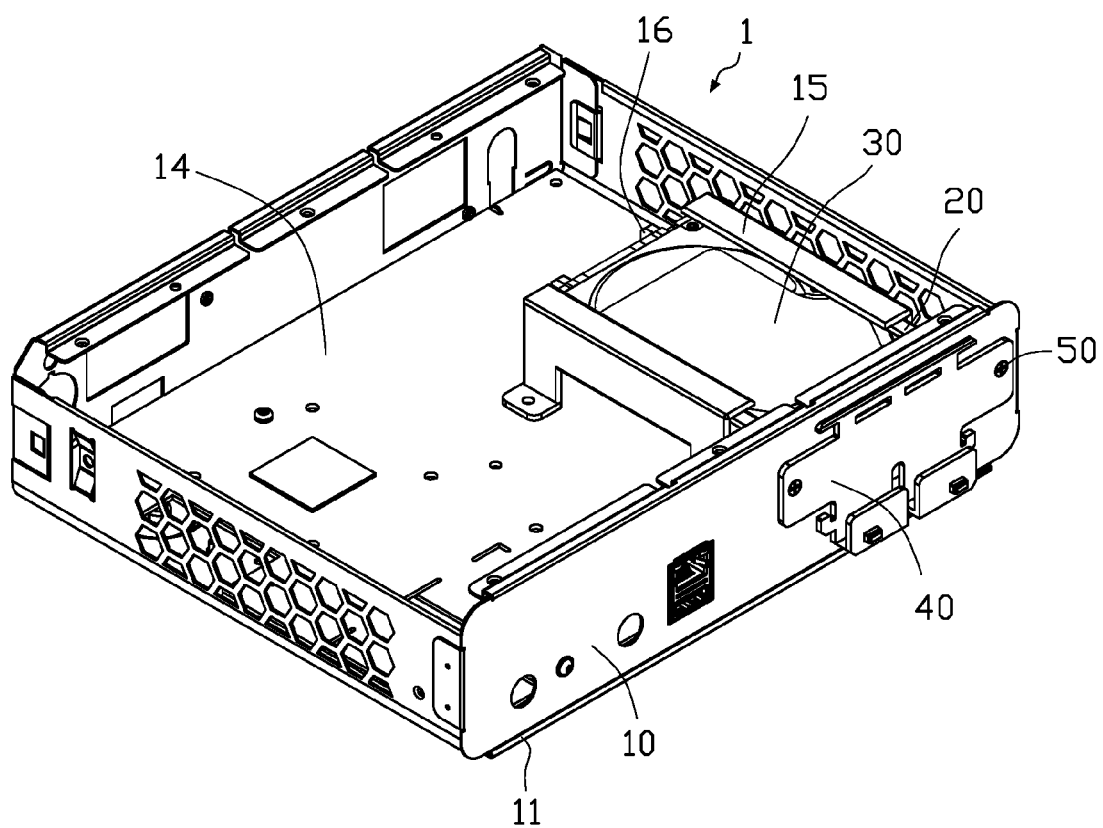
FIG. 1 is an assembled, isometric view of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure described in relation to an electronic device.

FIG. 1 illustrates an embodiment of an electronic device 1. The electronic device 1 comprises a chassis 10, a carrier 20, a storage device 30, and a cover 40.

Figure 2:
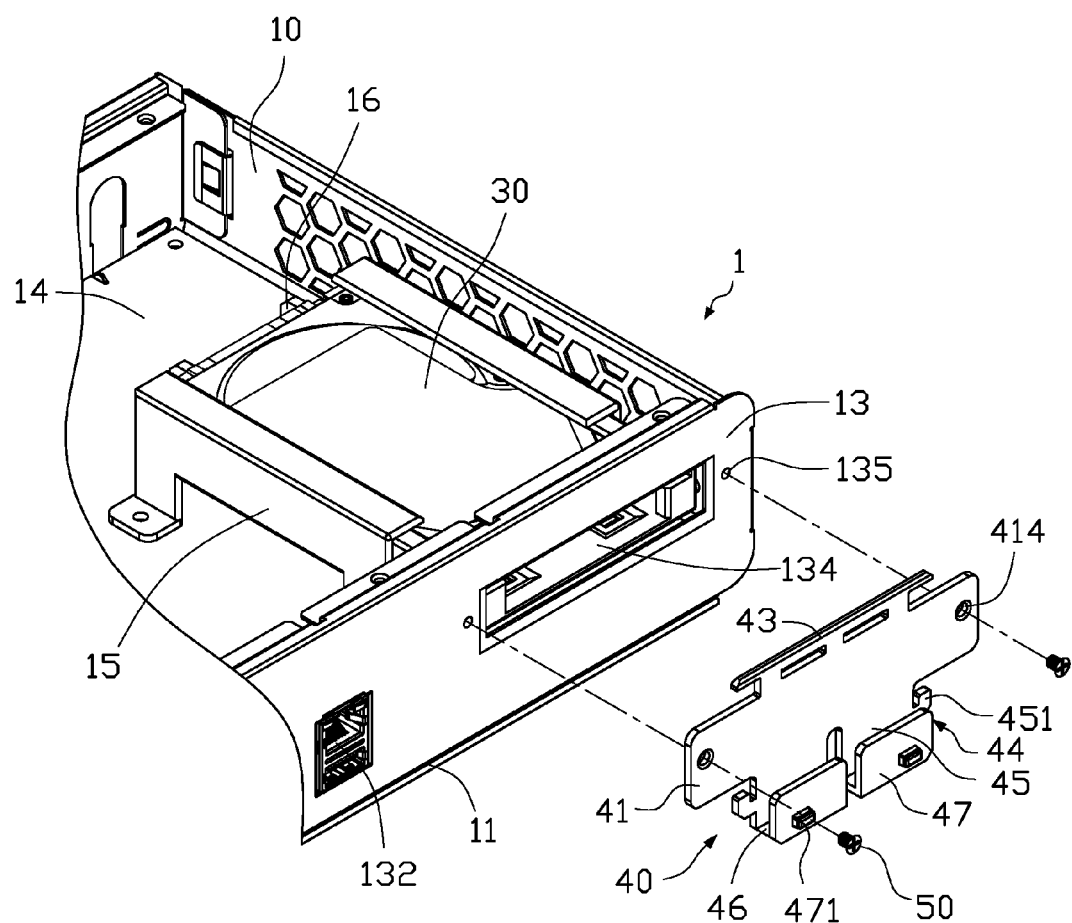
FIG. 2 is an exploded, isometric partial view of FIG. 1.

FIG. 2 illustrates that the chassis 10 comprises a bottom plate 11, a panel 13 extending substantially perpendicular from a front end of the bottom plate 11, a circuit board 14 mounted on the bottom plate 11, and a supporting frame 15 mounted on the circuit board 14. The circuit board 14 is parallel to the bottom plate 11. A plurality of sockets 132 is mounted on the panel 13. An opening 134 is defined in the panel 13, for allowing the carrier 20 to extend there through. Two fixing holes 135 are defined in the panel 13 at two opposite sides of the opening 134.

Figure 3:
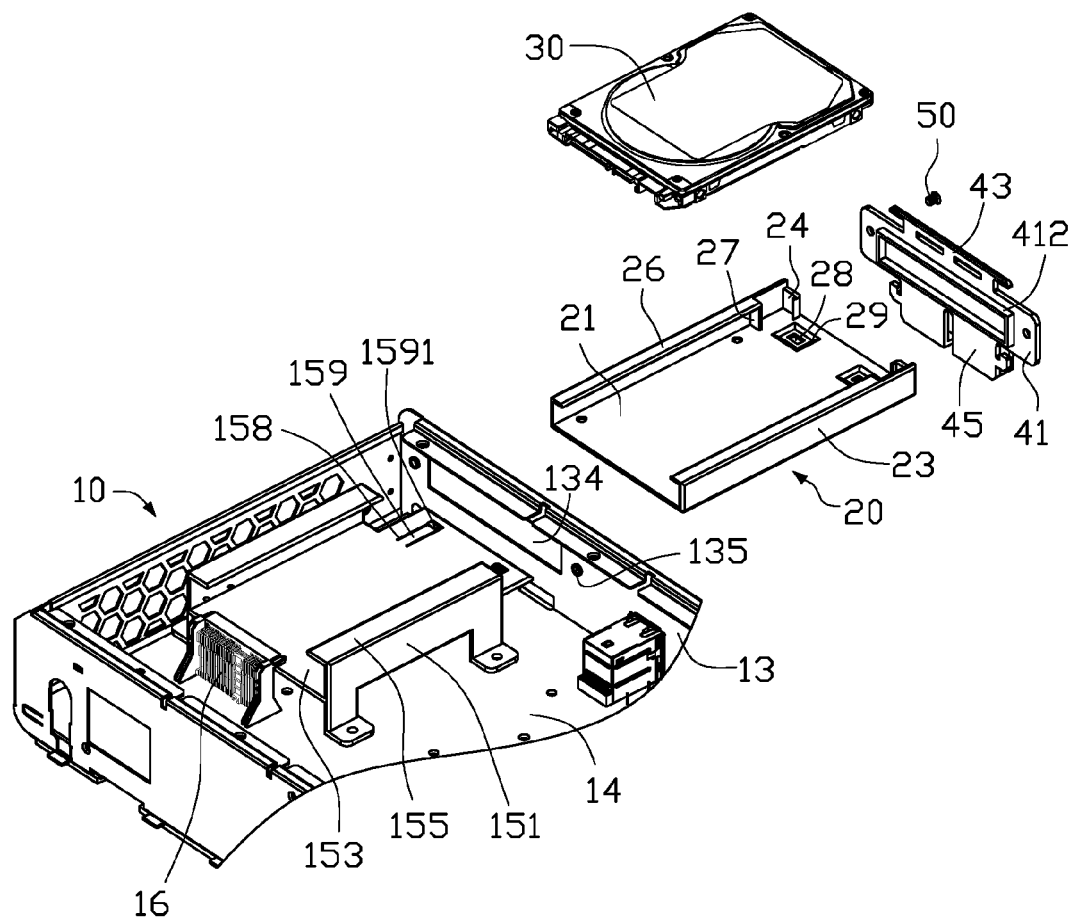
FIG. 3 is an exploded, isometric partial view of FIG. 1 from another angle.
Figure 4:
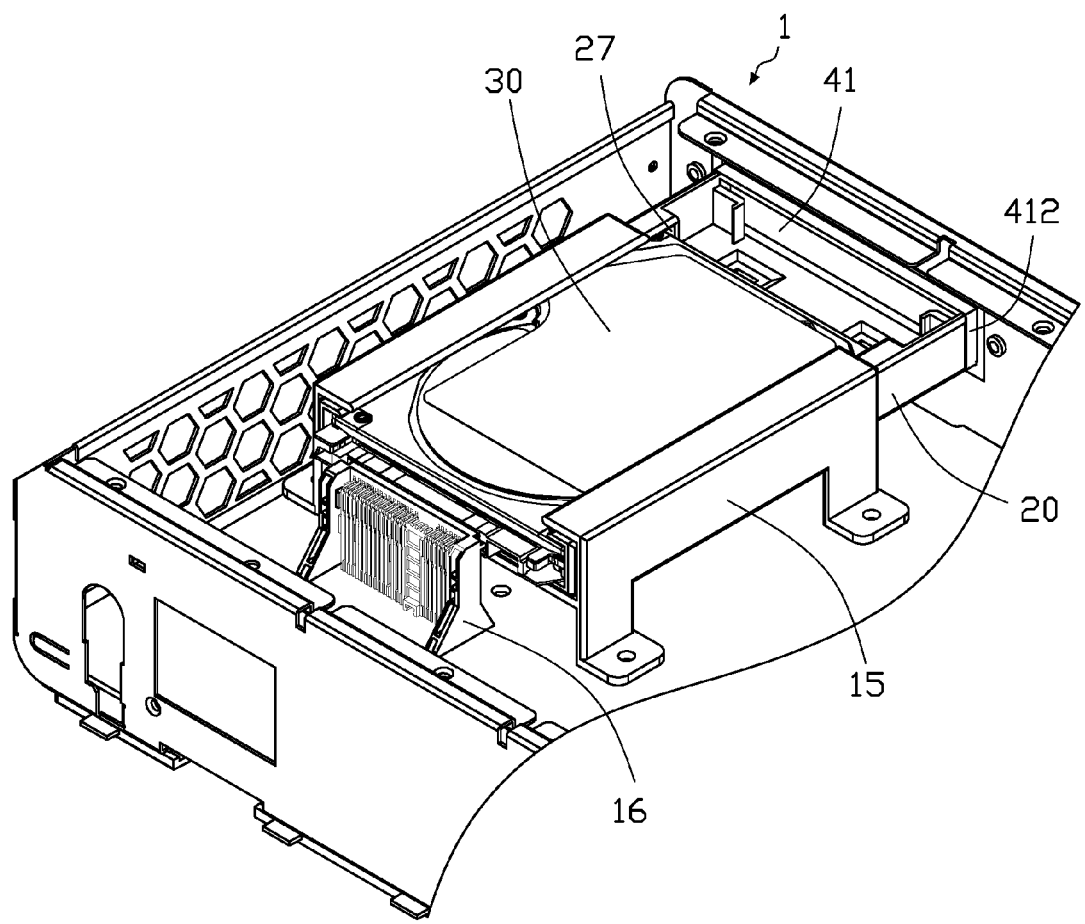
FIG. 4 is an assembled, isometric view of FIG. 3.

FIG. 3 is an exploded, isometric partial view of the electronic device 1 of FIG. 1 from another angle. The supporting frame 15 comprises two opposite side plates 151 perpendicularly mounted on the circuit board 14, and a supporting plate 153 coupled between middle portions of the side plates 151. A front end of the supporting frame adjacent to the panel 13 aligns with the opening 134. The side plates 151 are perpendicular to the panel 13. Two top plates 155 extend toward each other from tops of the side plates 151 away from the circuit board 14. The supporting plate 153 is parallel to and spaced from the circuit board 14. A front end of the supporting plate 153 adjacent to the panel 13 is exposed out of front ends of the side plates 151 adjacent to the panel 13. Two through slots 158 are defined in the front end of the supporting plate 153. A resilient hook 159 extends forward from a rear end of each through slot 158 away from the panel 13. The resilient hook 159 comprises an upward hooking portion 1591 at a front end thereof. A connector 16 is mounted on the circuit board 14 behind the supporting frame 15. In other embodiments, the supporting frame 15 may be mounted on the bottom plate 11.

The carrier 20 comprises a bottom wall 21, and two sidewalls 23 extending upward from opposite sides of the bottom wall 21. Two latches 24 extend toward each other from front ends of the sidewalls 23. Bottom ends of the latches 24 are coupled to the bottom wall 21. A distal end of each latch 24 adjacent to the opposite latch 24 is bent backward. Two top walls 26 extend toward each other from top portions of the sidewalls 23 behind the latches 24. A stop wall 27 extends down from a front end of each top wall 26. A bottom end of each stop wall 27 is coupled to the bottom wall 21. Two hooking slots 28 are defined in a front end of the bottom wall 21. An annular slanted surface 29 is formed on a top surface of the bottom wall 21, surrounding each hooking slot 28.

FIGS. 2 and 3 illustrate that the cover 40 comprises a vertical covering plate 41. A substantially rectangular hollow abutting portion 412 protrudes from a rear surface of the covering plate 41. Two through holes 414 are defined at two opposite ends of the covering plate 41. A handle 43 protrudes upward from a top side of the cover plate 41. A pulling mechanism 44 protrudes down from a middle of a bottom side of the covering plate 41. The pulling mechanism 44 comprises an extension portion 45 extending down from the middle of the bottom side of the covering plate 41, a connecting portion 46 extending forward from a bottom of the extension portion 45, and a bending portion 47 extending upward from a front side of the connecting portion 46. Two upward clasps 451 respectively protrude from two opposite ends of the extension portion 45. Two protrusions 471 extend outward from a front surface of the bending portion 471 facing away from the extension portion 45.

Referring to FIGS. 1-4, in assembly, the storage device 30 is inserted into the carrier 20 from a rear end of the carrier 20, until a front end of the storage device 30 abuts against the stop walls 27. The storage device 30 is sandwiched between the bottom wall 21 and the top walls 27, and is fixed to the carrier 20 through a plurality of screws. The carrier 20 is extended through the opening 134 of the panel 13, and inserted into a space between the supporting plate 153 and the top plates 155 of the supporting frame 15. The hooking portions 1591 of the resilient hooks 159 abut against the bottom wall 21 of the carrier 20 and deform the resilient hooks 159 downwardly. When the storage device 30 is connected to the connector 16, the hooking slots 28 align with the hooking portions 1591. The resilient hooks 159 are restored to engage the hooking portions 1591 in the hooking slots 28. Thereby, the carrier 20 is fixed to the supporting frame 15. The covering plate 41 is covered on the opening 134. Two screws 50 extend through the through holes 414 of the covering plate 41 and engage in the fixing holes 435 of the panel 13 to fix the cover 40 to an outside of the panel 13. The abutting portion 412 of the cover 40 abuts against a front end of the carrier 20, to prevent the carrier 20 from loosening.

Figure 5:
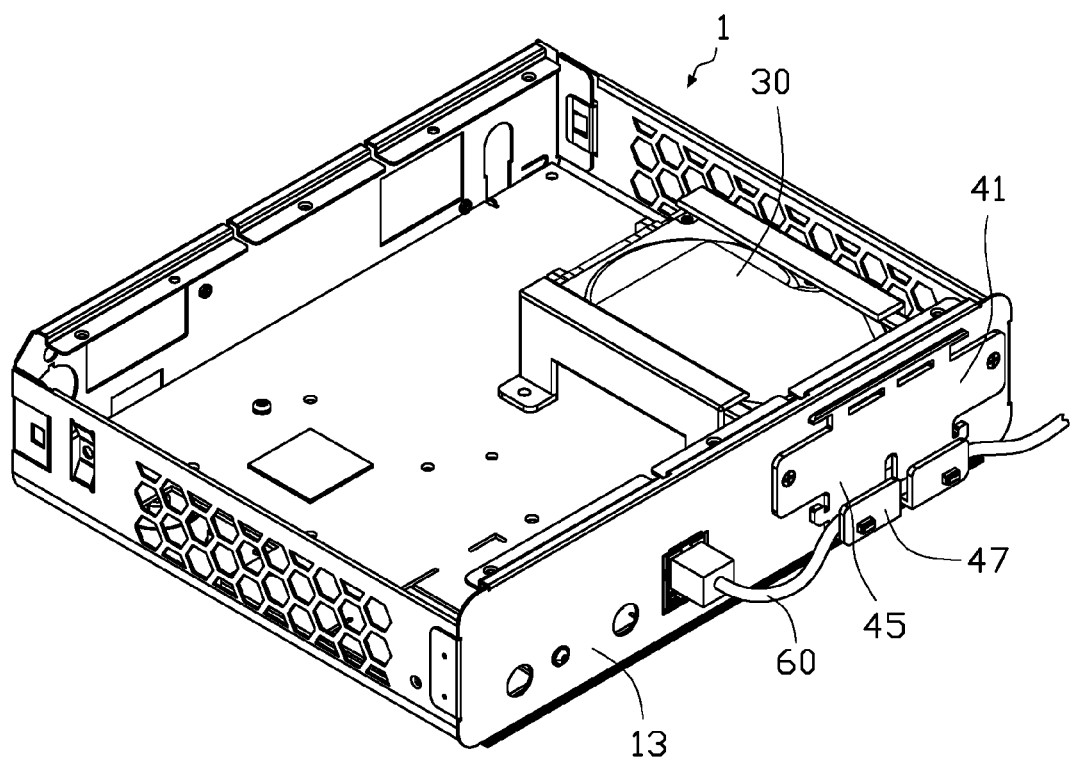
FIG. 5 is similar to FIG. 1, but showing the electronic device in use.

Referring to FIG. 5, in use, the extension portion 45, the connecting portion 46, and the bending portion 47 cooperate to form a wire holder, to receive wires 60 connected to the sockets 132 of the electronic device 1.

Figure 6:
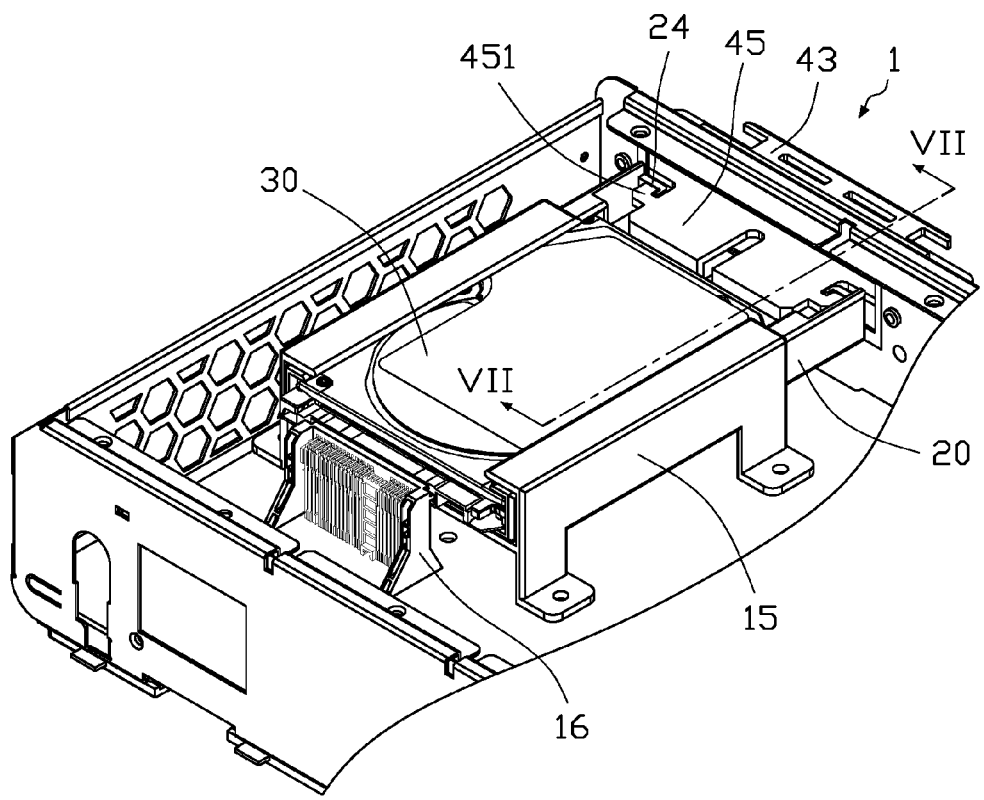
FIG. 6 is similar to FIG. 4, but showing the electronic device in a different status.
Figure 7:
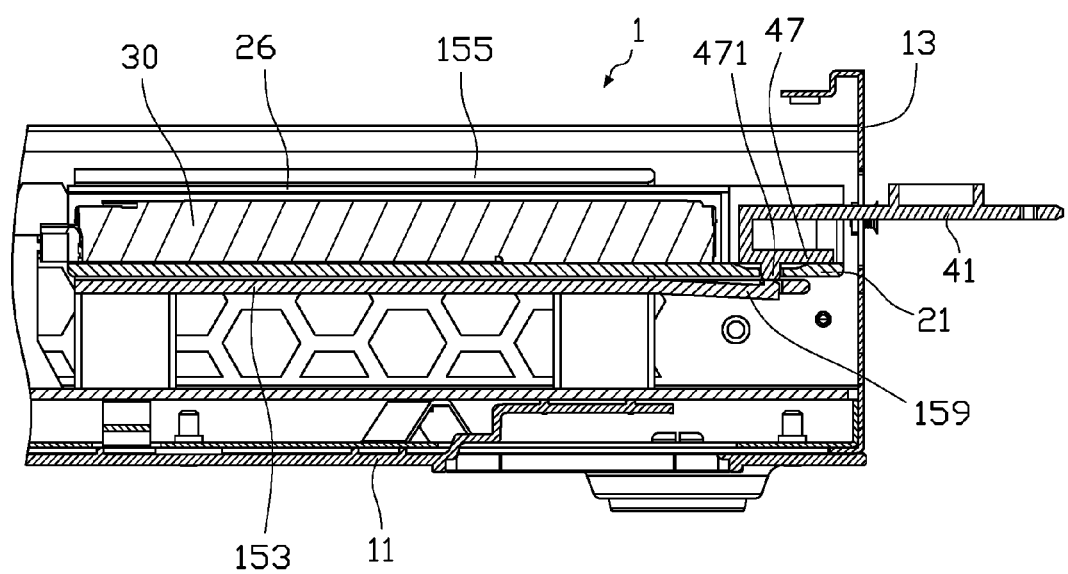
FIG. 7 is a cross-sectional view taken along line VII-VII of FIG. 6.
Figure 8:
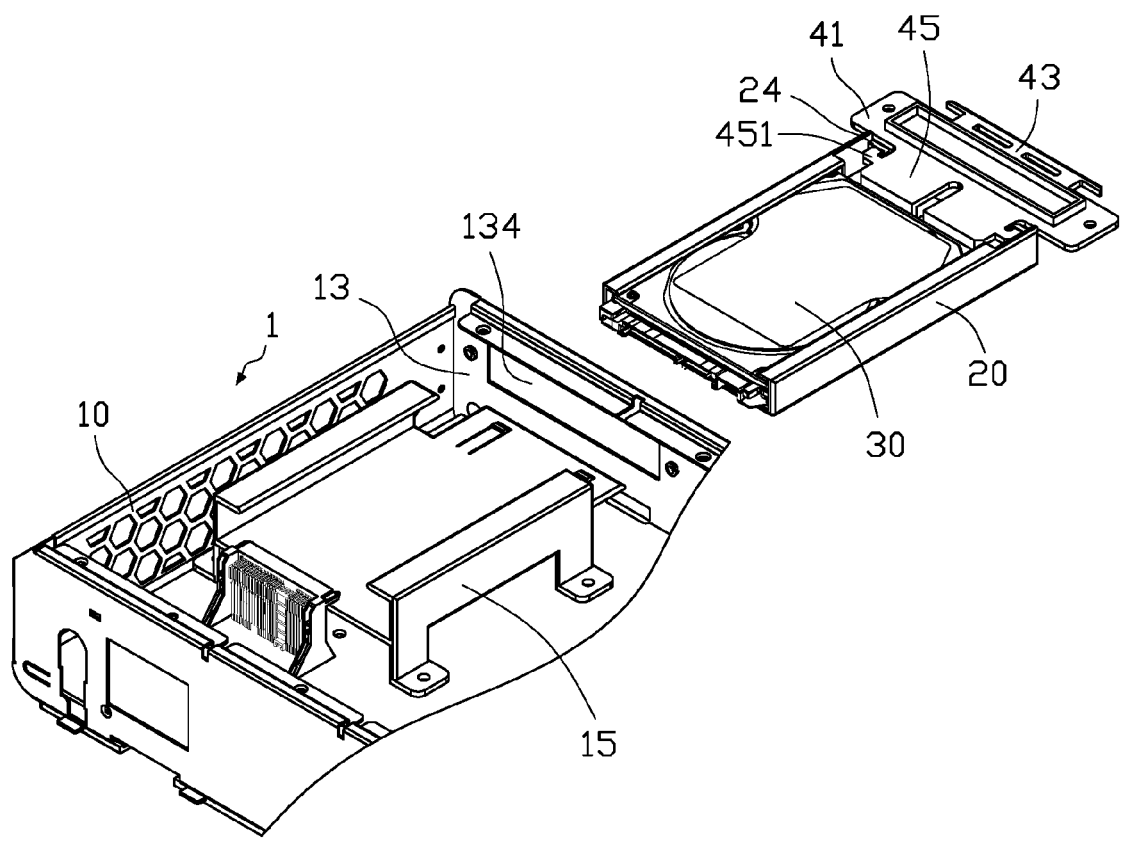
FIG. 8 is an exploded, isometric partial view of FIG. 6.

Referring to FIGS. 6-8, to detach the storage device 30, the screws 50 are disengaged. The cover 40 is dismantled and rotated 90 degrees to allow the protrusions 471 to face down. The pulling mechanism 44 is extended through the opening 134 of the panel 13 with the clasps 451 above and behind the latches 24 of the carrier 20. The cover 40 is moved down, to allow the clasps 451 engage with rear sides of the latches 24. The protrusions 471 of the bending portion 47 slide along the slanted surfaces 29, and engage in the hooking slots 28 of the carrier 20. The hooking portions 1591 are pushed down by the protrusions 471, and disengaged from the hooking slots 28. The resilient hooks 159 are deformed. The handle 43 is pulled forward, the protrusions 471 and the clasps 451 pull the carrier 20 partially out of the opening 134. Thereby, the carrier 20 can be easily pulled out of the chassis 10 by an operator, and the storage device 30 can be easily detached from the carrier 20. In this process, the carrier 20 and the operator may not touch and damage other components in the electronic device 1, and the cover 40 should be detached firstly, the storage device 30 is not easily to be detached by mistake.

It is to be understood, however, that even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An electronic device comprising:
   a chassis comprising a panel defining an opening therein;
   a supporting frame received in the chassis and having a front end aligned with the opening and forming two resilient hooks;
   a carrier configured to receive a storage device and to be received in the supporting frame, the carrier defining two hooking slots engaging with the resilient hooks of the supporting frame;
   a cover detachably mounted on an outside of the panel and comprising a covering plate covering the opening; and
   a pulling mechanism extending down from a middle of a bottom of the covering plate and comprises two protrusions, which when the cover is detached from the panel and rotated to allow the pulling mechanism to extend through the opening, wherein the protrusions engage in the hooking slots and disengage the resilient hooks from the hooking slots and when in a condition that the cover is pulled outward, the carrier is pulled out of the opening by the protrusions of the cover.

2. The electronic device of claim 1, wherein the supporting frame comprises two opposite side plates perpendicular to the panel, and a supporting plate coupled between middle portions of the side plates and perpendicular to the panel, the resilient hooks are formed on a front end of the supporting plate, the carrier comprises a bottom wall supported on the supporting plate, the hooking slots are defined in a front end of the bottom wall.

3. The electronic device of claim 2, wherein the carrier further comprises two sidewalls extending upward from opposite sides of the bottom wall, two top walls extend toward each other from top portions of the sidewalls behind the hooking slots, and a stop wall extends down from a front end of each top wall and is coupled to the bottom wall, for abutting with a front end of the storage device.

4. The electronic device of claim 3, wherein two latches extend toward each other from front ends of the sidewalls, the pulling mechanism comprises an extension portion extending down from the middle of the bottom side of the covering plate, two clasps respectively protrude from two opposite ends of the extension portion, when the pulling mechanism extends into the opening and the protrusions engage in the hooking slots, the clasps engage with rear sides of the latches.

5. The electronic device of claim 4, wherein bottoms of the latches are coupled to the bottom wall.

6. The electronic device of claim 2, wherein two top plates extend toward each other from tops of the side plates of the supporting plate, the carrier is sandwiched between the supporting plate and the top plates.

7. The electronic device of claim 2, wherein two through slots are defined in the front end of the supporting plate, the resilient hooks respectively extend forward from rear ends of the through slots, and each resilient hook comprises an upward hooking portion at a front end thereof.

8. The electronic device of claim 1, wherein the pulling mechanism comprises an extension portion extending down from the middle of the bottom side of the covering plate, a connecting portion extending forward from a bottom of the extension portion, and a bending portion extending upward from a front side of the connecting portion, the protrusions are formed on a front surface of the bending portion facing away from the extension portion.

9. The electronic device of claim 1, wherein the cover is mounted on the panel by screws.

10. The electronic device of claim 1, wherein an abutting portion protrudes from a rear surface of the covering plate to abut against a front end of the carrier.

11. The electronic device of claim 1, wherein a handle is formed on a top of the covering plate.

\* \* \* \* \*